United States Patent [19]

Van Den Brink

[11] Patent Number: 5,004,416

[45] Date of Patent: Apr. 2, 1991

[54] INJECTION NOZZLE FOR USE IN AN INJECTION MOULDING DEVICE

[75] Inventor: Anthonie Van Den Brink, Westmaas, Netherlands

[73] Assignee: Eurotool B.V., 'S-Gravendeel, Netherlands

[21] Appl. No.: 431,311

[22] Filed: Oct. 30, 1989

[30] Foreign Application Priority Data

Nov. 15, 1988 [NL] Netherlands .................. 8802810

[51] Int. Cl.$^5$ .................................................. B29C 45/23
[52] U.S. Cl. ......................................... 425/564; 251/229; 264/328.9; 475/566; 475/568
[58] Field of Search ............... 425/548, 549, 562, 563, 425/564, 568, 566; 264/328.9, 328.15; 251/229, 249.5, 250, 267

[56] References Cited

U.S. PATENT DOCUMENTS

| | | | |
|---|---|---|---|
| 3,553,788 | 1/1971 | Putkowski | 425/548 |
| 3,912,133 | 10/1975 | Hehl | 425/563 |
| 4,010,903 | 3/1977 | Sakuri et al. | 425/549 |
| 4,330,258 | 5/1982 | Gellert | 425/564 |
| 4,394,117 | 7/1983 | Taylor | 425/564 |
| 4,787,840 | 11/1988 | Gellert | 425/549 |

FOREIGN PATENT DOCUMENTS 7407409  1/1975  Netherlands .
7507689  12/1975  Netherlands .
2085350  4/1982  United Kingdom .

OTHER PUBLICATIONS

"Plastics Mold Engineering Handbook", pp. 123,124.

Primary Examiner—Timothy Heitbrink
Attorney, Agent, or Firm—Young & Thompson

[57] ABSTRACT

Injection nozzle for use in a device for moulding an article made of a thermoplastic material in an injection mould, has a nozzle with at least one feed channel which runs through it, and which at one end is connected to a feed of the thermoplastic material and at the other end connects to an outflow aperture, and at this end has a seat which can mate with the shut-off end of a to and fro moveable shut-off pin running through the channel. A mechanism for moving the pin is in the form of a ring provided with internal screw thread which engages at least one element which projects essentially radially relative to the pin, and which is situated in the feed channel and permits the passage of the material through the channel, and the end of which engages with the internal screw thread of the ring, the element being located between the connection of the channel to the material feed and the outflow aperture, and the end faces of the ring being in sealing contact with sealing faces provided in the nozzle.

5 Claims, 2 Drawing Sheets

INJECTION NOZZLE FOR USE IN AN INJECTION MOULDING DEVICE

FIELD OF THE INVENTION

The invention relates to an injection nozzle for use in a device for moulding an article made of a thermoplastic material in an injection mould, comprising a nozzle with at least one feed channel which runs through it, and which at one end is connected to a feed of the thermoplastic material and at the other end connects to an outflow aperture, and at this end has a seat which can mate with the shut-off end of a to and fro moving shut-off pin running through the channel, a mechanism being present for moving the pin only to and fro, said mechanism comprising a ring provided with an internal screw thread which engages in such a way with an element which is connected to the pin that, through rotation of the ring, the pin moves up and down, and means for setting the ring in rotary motion. Such an injection nozzle is known from U.S. Pat. No. 4,330,258.

BACKGROUND OF THE INVENTION

In the injection moulding of a thermoplastic material, this material is injected in a warm, soft state and under pressure through an injection nozzle into the mould cavity in an injection mould. In this process, at the outflow aperture of the nozzle, where the material enters into the mould cavity, there has to be an abrupt transition from the temperature of the channel running through the nozzle to the temperature of the mould cavity, in order to ensure that when the finished article is being removed from the mould, a clean break is obtained between this article and the material still present in the outflow aperture. However, such an abrupt temperature transition cannot be achieved since, due to the fact that in injection moulding very high pressures are used, and the mould is made of a high-grade metal and/or ceramic material, a certain heat transfer will always take place between the nozzle and the mould.

For the solution to this problem, in the device according to the above-mentioned publication, use is made of a so-called shut-off pin which in combination with the above-mentioned seat at the outflow aperture can shut off said aperture mechanically, so that after the injection moulding of an article, by taking the shut-off pin into the shutting-off position, the material in the feed channel is separated from the material injected into the mould cavity, as a result of which a clean break is obtained.

In the known nozzle the pin is guided in sealing fashion through a hole in a sealing bush which is disposed above the above-mentioned one end of the channel running through the nozzle, at which end said channel is connected to a feed of the material. This feed passes here into a bend or loop. In this way the pin is thus conveyed to an area which does not contain any material when the nozzle is in operation.

The disadvantage of such a sealing bush is that a permanently good sealing engagement of the pin is difficult to achieve, since account has to be taken here of the fact that very high pressures are used for injection moulding, many plastics are chemically very active at high temperature, and the plastics used can contain abrasive fillers such as glassfibre and chalk, while the shut-off pin is often moved quickly to and fro millions of times. Due to the high pressures used, the sealing bush has to be of a very strong, rigid material which cannot easily be deformed, so that a self-correcting seal round the pin is virtually impossible to achieve.

The object of the invention is to produce an injection nozzle of the above-mentioned type which does not have this disadvantage.

BRIEF SUMMARY OF THE INVENTION

This object is achieved through the fact that in the injection nozzle according to the invention the element connected to the pin is formed by at least one element which projects essentially radially relative to the pin, and which is situated in the feed channel and permits the passage of the material through said channel, and the end of which engages with the internal screw thread of the ring, said element being located between the connection of the above-mentioned channel to the material feed and the outflow aperture, and the end faces of the ring being in sealing contact with sealing faces provided in the nozzle.

In a nozzle designed in this way, due to the fact that no sealing bush is used, the pin is thus completely enclosed by the material and driven in this material, while the seals are now located at the end faces of the ring, said seals being self-correcting. Moreover, in the nozzle according to the invention the feed of the material need not pass into a bend or loop, a transition which does involve various disadvantages in design.

In a first embodiment the projecting element is formed by at least two fin-shaped parts lying diametrically opposite each other, each provided on the outside edge with a screw thread segment which is in engagement with the internal screw thread of the ring.

The projecting element can advantageously also be formed by an externally threaded bush which is connected to the pin by means of at least one connecting element projecting essentially radially relative to the pin, the said external screw thread being in engagement with the internal screw thread of the ring.

The end faces of the ring are preferably pressed by means of at least one spring element in sealing contact against the sealing faces, as a result of which very good self-correcting sealing is obtained.

It is advantageous here to provide an annular layer of a wear-resistant material between the end faces of the ring and the sealing faces.

BRIEF DESCRIPTION OF THE DRAWINGS

The invention is explained in greater detail with reference to the drawings, in which.

DETAILED DESCRIPTION OF THE INVENTION

Figure 1:
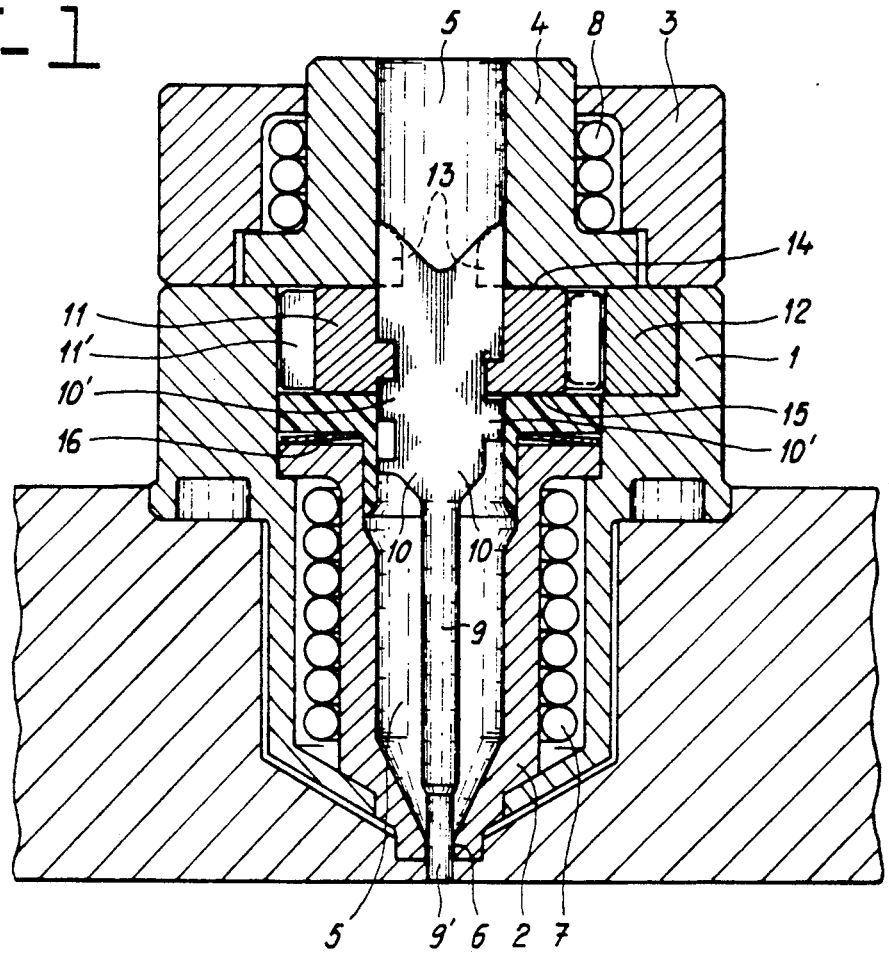
FIG. 1 shows in longitudinal section a first embodiment of the nozzle according to the invention.
Figure 2:
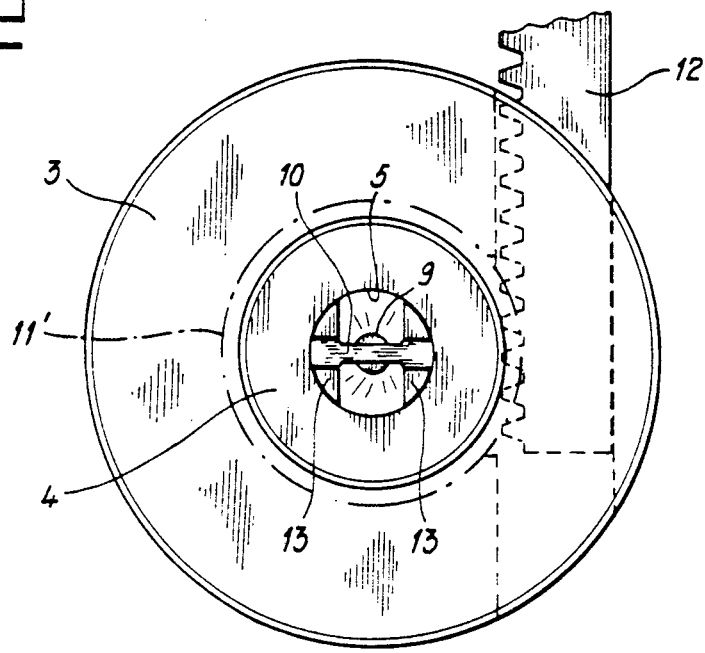
FIG. 2 shows a top view of the nozzle shown in FIG. 1.

As shown in FIGS. 1 and 2, the injection nozzle comprises a nozzle made up of the parts 1 and 2 and a top piece comprising the parts 3 and 4. A feed channel 5 which passes into the outflow aperture 6 runs through the nozzle part 2 and the top piece part 4. A heating element 7 is disposed between the parts 1 and 2 of the nozzle, and a heating element 8 is provided between the parts 3 and 4 of the top piece.

The feed channel 5 is fitted with a shut-off pin 9 whose end 9' shuts off the outflow aperture 6 in the lowest position of the pin 9 shown in FIG. 1. At the top end the pin 9 is provided with two fin-shaped parts 10 which lie diametrically opposite each other and are each provided on the outside edge with a screw thread segment 10'. These screw thread segments 10' are in engagement the internal screw thread of a ring 11, which along the outer periphery is provided with a toothing 11'. Said toothing 11' is in engagement with a gear rack 12, which can be moved to and fro by means which are not shown. Through this movement of the gear rack 12, the ring 11 is rotated, as a result of which the pin 9 is moved up and down by means of the internal screw thread of said ring and the screw thread segments 10', so that said pin can be moved from the shutting-off position shown in FIG. 1, to a raised position releasing the outflow aperture 6, and back again. In order to prevent the pin 9 from rotating here, provision is made in the top piece part 4 for guide cams 13, between which the fin-shaped parts 10 are guided.

The sealing faces of the ring 11, which are formed by wear-resistant faces, are shown at 14 and 15. These faces are held sealed by means of the spring 16.

Figure 3:
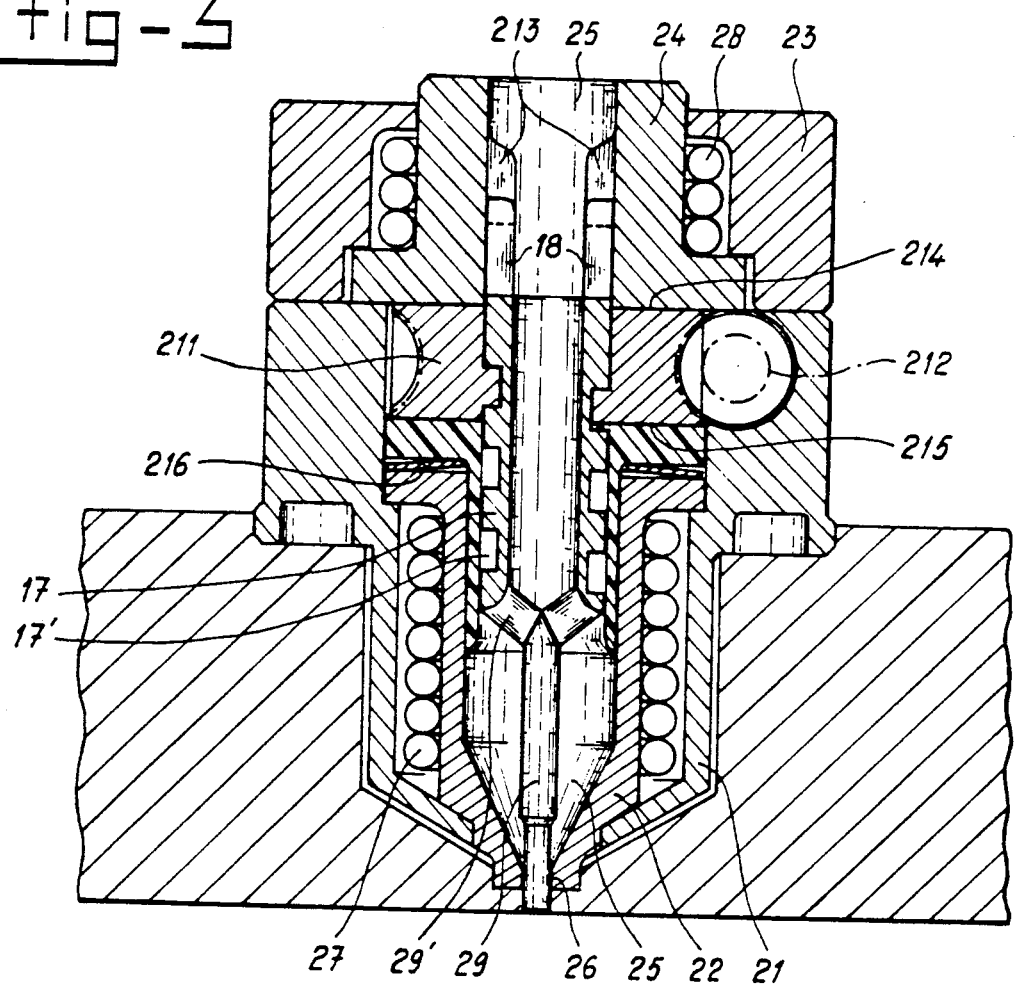
FIG. 3 shows a second embodiment of the nozzle according to the invention, in longitudinal section.
Figure 4:
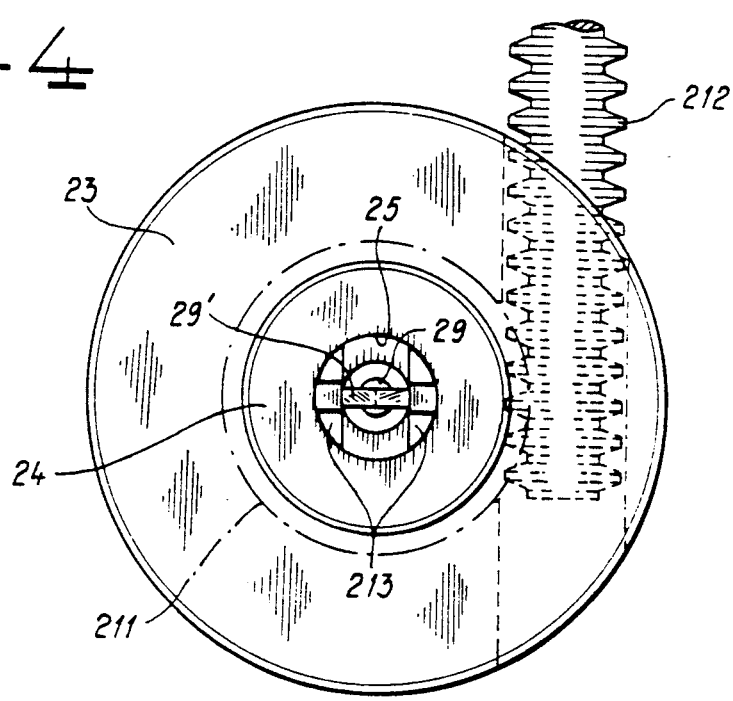
FIG. 4 shows a top view of the nozzle according to FIG. 3.

The embodiment shown in FIGS. 3 and 4 corresponds largely to that shown in FIGS. 1 and 2, so that the same reference numbers are used for the same parts, but with the number 2 added in front of them.

The injection nozzle thus also comprises a nozzle 21, 22, a feed channel 25 with an outflow aperture 26, a pin 29, a top piece comprising the parts 23 and 24, the internally threaded ring 211 with the sealing faces 214 and 215, and the spring 216.

In this embodiment, the pin 29 is, however, connected by means of the parts 29' to an annular element 17 which is provided with an external screw thread 17' which is in engagement with the internal screw thread of the ring 211.

In this embodiment, the ring 211 is also designed as a worm wheel, the gear rack being replaced by a worm 212, which can be set in rotation by means which are not shown.

In order to prevent the annular element 17 from rotating, said element is provided at the top side with projections 18 which are fitted between the guide cams 213.

I claim:

1. In an injection nozzle for use in a device for moulding an article made of a thermoplastic material in an injection mould, said injection nozzle comprising a nozzle with at least one feed channel running therethrough, a first end of said injection nozzle operable to receive thermoplastic material and a second end of said injection nozzle connected to an outflow aperture, said second end having a seat mating with an end of an upwardly and downwardly moving shut-off pin running through the feed channel, moving means for moving the pin upwardly and downwardly, said moving means comprising a ring provided with an internal screw thread which engages in such a way with an element which is connected to the pin that, through rotation of the ring, the pin moves upwardly and downwardly and means for setting the ring in rotary motion; the improvement wherein said element connected to the pin projects essentially radially outwardly relative to the pin, said element being situated in the feed channel and permitting passage of the thermoplastic material through said feed channel and said outflow aperture when the rotary motion of the ring moves the pin upwardly, said element being located between the first end of said injection nozzle and the outflow aperture, and end faces of the ring being in sealing contact with sealing faces provided in the nozzle.

2. Injection nozzle according to claim 1, wherein the projecting element is formed by at least two fin-shaped parts lying diametrically opposite each other, each fine-shaped part provided on an outside edge of said shut-off pin and each fin-shaped part being provided with a screw thread segment which is in engagement with the internal screw thread of the ring.

3. Injection nozzle according to claim 1, wherein the projecting element is formed by an externally threaded bush which is connected to the pin by means of at least one connecting element projecting essentially radially relative to the pin, the external screw thread on the bush being in engagement with the internal screw thread of the ring.

4. Injection nozzle according to claim 1, wherein said end faces of the ring are pressed by means of at least one spring element into sealing contact against the sealing faces of the nozzle.

5. Injection nozzle according to claim 1, wherein an annular layer of a wear-resistant material is provided between the end faces of the ring and the sealing faces of the nozzle.

* * * * *